US012541663B2

(12) United States Patent
Casavant

(10) Patent No.: US 12,541,663 B2
(45) Date of Patent: Feb. 3, 2026

(54) WIRELESS TAG LOCATION

(71) Applicant: Wiliot, Ltd., Caesarea (IL)

(72) Inventor: Eric Casavant, San Diego, CA (US)

(73) Assignee: Wiliot, Ltd., Caesarea (IL)

( * ) Notice: Subject to any disclaimer, the term of this patent is extended or adjusted under 35 U.S.C. 154(b) by 66 days.

(21) Appl. No.: 18/399,177

(22) Filed: Dec. 28, 2023

(65) Prior Publication Data

US 2025/0217610 A1      Jul. 3, 2025

(51) Int. Cl.
*G06K 7/10* (2006.01)
*G06T 7/70* (2017.01)

(52) U.S. Cl.
CPC ............ *G06K 7/10366* (2013.01); *G06T 7/70* (2017.01)

(58) Field of Classification Search
CPC ............................... G06K 7/10366; G06T 7/70
See application file for complete search history.

(56) References Cited

U.S. PATENT DOCUMENTS

| | | | | |
|---|---|---|---|---|
| 8,624,725 | B1 * | 1/2014 | MacGregor | H04W 12/06 342/450 |
| 9,171,278 | B1 * | 10/2015 | Kong | B65G 1/137 |
| 10,282,573 | B1 * | 5/2019 | DeBates | H04B 5/77 |
| 2010/0092034 | A1 * | 4/2010 | Arnaud | G06V 10/245 382/103 |
| 2015/0279112 | A1 * | 10/2015 | Meftah | G06T 19/006 345/633 |
| 2017/0092090 | A1 * | 3/2017 | Lerner | G08B 13/2462 |
| 2018/0247421 | A1 * | 8/2018 | DeAngelis | H04N 23/695 |
| 2021/0056370 | A1 * | 2/2021 | Niu | G05B 19/042 |
| 2021/0326959 | A1 * | 10/2021 | Haapoja | G06N 20/00 |

OTHER PUBLICATIONS

WO 2019/214645A1 (Year: 2019).*

* cited by examiner

*Primary Examiner* — Thomas D Alunkal
(74) *Attorney, Agent, or Firm* — M&B IP Analysts, LLC

(57) ABSTRACT

A method and system for determining a location of a wireless tag. The method comprises: obtaining an image of the wireless tag by a camera of a user device; determining a location of the user device based on location signals received by the user device; determining an orientation of the user device; determining a location of the wireless tag with respect to the user device based on the obtained image and the orientation of the user device; and combining the determined location of the user device with the determined location of the wireless tag with respect to the user device to obtain a final location of the wireless tag.

19 Claims, 4 Drawing Sheets

WIRELESS TAG LOCATION

TECHNICAL FIELD

This invention relates to wireless tags and, more specifically, to an improved method for determining the location of the wireless tag.

BACKGROUND

It is often desirable to know the location of a wireless tag, which may be referred to hereinafter simply as a "tag", especially given that a tag is typically affixed to an item and it is the location of the item that is truly of interest. Prior art solutions for locating a tag typically involve triangulation based on the receiving a signal from the tag at more than one tag reader and knowing the location to the readers. However, the accuracy of the location provided by such solutions is, unfortunately, limited.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

obtaining an image of the wireless tag by a camera of a user device; determining a location of the user device based on location signals received by the user device; determining an orientation of the user device; determining a location of the wireless tag with respect to the user device based on the obtained image and the orientation of the user device; and combining the determined location of the user device with the determined location of the wireless tag with respect to the user device to obtain a final location of the wireless tag.

Certain embodiments disclosed herein include a system for determining a location of a wireless tag. The system comprises: a processing circuitry; and a memory, the memory containing instructions that, when executed by the processing circuitry, configure the system to: obtain an image of the wireless tag by a camera of a user device; determine a location of the user device based on location signals received by the user device; determine an orientation of the user device; determine a location of the wireless tag with respect to the user device based on the obtained image and the orientation of the user device; and combine the determined location of the user device with the determined location of the wireless tag with respect to the user device to obtain a final location of the wireless tag.

Certain embodiments disclosed herein include a non-transitory computer readable medium having stored thereon instructions for causing a processing circuitry to execute a process for determining a location of a wireless tag, the process comprising: obtaining an image of the wireless tag by a camera of a user device; determining a location of the user device based on location signals received by the user device; determining an orientation of the user device; determining a location of the wireless tag with respect to the user device based on the obtained image and the orientation of the user device; and combining the determined location of the user device with the determined location of the wireless tag with respect to the user device to obtain a final location of the wireless tag.

DETAILED DESCRIPTION

Figure 1:
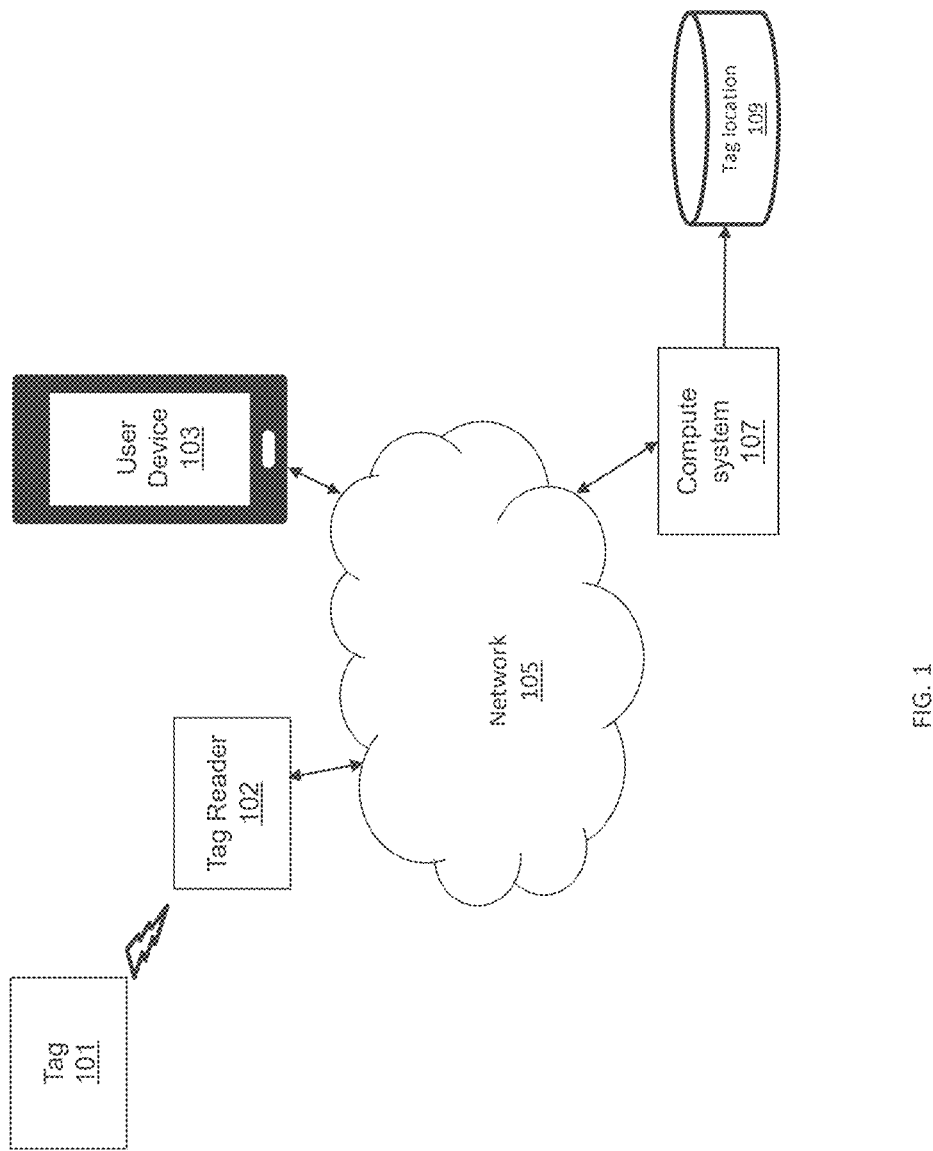
FIG. 1 shows an illustrative hardware environment employed to determine the location of a tag in accordance with the principles of the disclosure.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be the in plural and vice versa with no loss of generality. In the drawings, like numerals refer to like parts through several views.

In accordance with the principles of the disclosure, the location of a wireless tag is determined in association with a user device, e.g., a mobile phone. A camera on the user device is used to obtain an image of the tag. Based on the orientation of the phone and how the tag appears in the image the location of the tag with respect to the user device can be determined. The location of the user device can be learned in the conventional manner, e.g., through the use of location signals such as global positioning signals (GPS) signals or any other highly accurate locating system, which may be more localized or satellite based. The determined location of the tag with respect to the user device is combined with the location of the user device to determine an overall location of the tag. The particular tag whose location is determined may be based on wireless signals supplied from the tag or based on an identifying code, e.g., a quick-response (QR) code, that is printed on the tag and that is visible in the obtained image.

FIG. 1 shows an illustrative hardware environment employed to determine the location of a tag in accordance with the principles of the disclosure. Shown in FIG. 1 are tag 101, tag reader 102, user device 103, network 105, and compute system 107. Tag reader 102, user device 103, and compute system 107 are coupled via network 105. Tag 101 is wirelessly communicatively coupled to tag reader 102, and hence is further communicatively coupled via network 105, e.g., to compute system 107. Compute system 107 is communicatively coupled to tag location 109.

Tag 101 is a conventional wireless tag known in the art, e.g., one of Wiliot's IoT Pixels. Tag 101 may employ a battery or be battery-less and rely solely on harvested energy. Such tags typically employ Bluetooth® and Bluetooth low energy (BLE) for wireless connectivity over the 2.4 GHz industrial, scientific and medical (ISM) band. Other low energy communication protocols include LoRa, nRF, DECT® Ultra Low Energy (DECT ULE), Zigbee®, Z-Wave®, EnOcean®, and the like can be used for wireless tags in a similar manner to Bluetooth and BLE. For simplicity and pedagogical purposes, this disclosure uses BLE as an illustrative example, although the disclosure is applicable to tags that employ such other low energy communication protocols.

Tag reader 102 communicates with tag 101 using the low-energy communications protocol, e.g., BLE, and may relay messages between tag 101 and network 105. Thus, messages may be transmitted from tag 101 and delivered to compute system 107 and vice versa.

User device 103 is typically a mobile phone, although it may be, a personal computer, a laptop, a tablet computer, a wearable computing device, or other similar device. User device 103 has a variety of sensors including at least a camera for detecting images and one or more gyroscopic sensors to determine an orientation of the user device. User device 103 also includes a GPS system for receiving GPS signals from satellites and based thereon determining a location of user device 103. The techniques of this disclosure are agnostic to the particular way in which user device 103 performs the orientation sensing, the particular implementation of the GPS system, and the camera technology employed. Note that other forms of GPS systems and signals, e.g., GLONASS, may be employed.

Network 105 may be, but is not limited to, a wireless, cellular or wired network, a local area network (LAN), a wide area network (WAN), a metro area network (MAN), the Internet, the worldwide web (WWW), similar networks, and any combination thereof.

Compute system 107 may be deployed locally, e.g., a local computer or server, it may be deployed in the cloud, or it may be part of a cloud computing platform. Such a cloud computing platform may include a public cloud, a private cloud, a hybrid cloud, or combination thereof. In some embodiments, tag location 109 is a storage used by compute system 107 to store therein a tag's location. In one embodiment, tag location 109 may be remote from compute system 107 and connected thereto by a link which may be part of network 105. In another embodiment, tag location 109 may be part of compute system 107.

Figure 2:
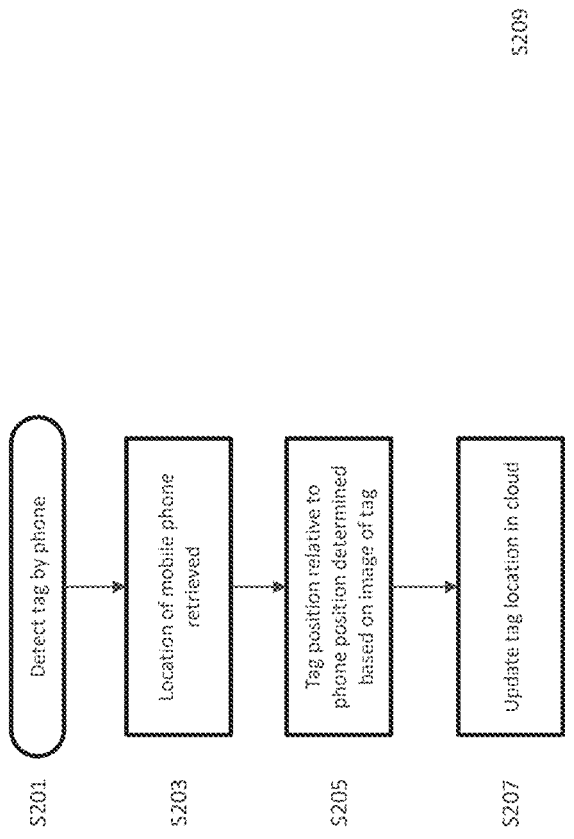
FIG. 2 shows a flowchart of an illustrative process for calibrating a tag in coordination with a mobile phone, in accordance with the principles of the disclosure.

FIG. 2 shows a flowchart of an illustrative process for determining the location of a tag in coordination with a mobile phone, in accordance with the principles of the disclosure.

The is entered in S201 when a tag, e.g., tag 101, is detected by a user device, e.g., mobile phone 103. This detection may be done by an application executing on the mobile phone.

In one embodiment the mobile phone may detect tag 101 by receiving BLE messages that are transmitted by the tag. Note that many mobile phones can receive BLE messages. There are BLE messages that contain a unique identifier supplied by the tag and such identifier may be used to identify the tag. In the event that the BLE messages are encrypted, mobile phone 103 can send the message to compute system 105 to be decrypted and then receive back the decrypted message.

However, BLE is not particularly good at determining which tag is transmitting, especially when there are multiple tags in the vicinity. Therefore, in another embodiment, the presence of the tag is detected based on its appearance in an image taken using the camera of mobile phone 103. The particular tag in the image may be determined by analysis of an identifying code, e.g., a bar code or a QR code, printed thereon. Of course, the aforementioned two embodiments may be combined, so that, for example, an initial detection may be made using BLE and a more specific detection made by image.

In S203, the location of the mobile phone based on the GPS signals it is receiving is determined. Embodiments that employ detection of the tag by the mobile phone using BLE are only able to determine that the tag is within 10 meters of the mobile phone. If such a crude estimate of the location of the phone is sufficient it may be reported by the mobile phone to a compute system, e.g., via network 105 to compute system 107, and the process exited.

However, such a crude location estimate is often insufficient. Therefore, in S205 a more accurate position of the tag relative to the mobile phone is determined.

This is achieved by using an image of the tag and the identifying code printed thereon. This image is obtained by employing the camera of mobile phone 103. If such an image was obtained in S201, that image may be employed in S205. If such an image was not obtained in S201, then such an image may be obtained in S205.

Based on a knowledge of the tag's size and what portion of the image the tag occupies, as well as the orientation and position of the mobile phone, which is determined based on the gyroscopic sensors of the mobile phone, and at least one property of the mobile phones' camera, e.g., the focal distance of the camera's lens, Euclidean geometry may be employed to solve for a precise position of the tag. Such a precise position may be within inches of where the tag is.

For example, the distance from the mobile phone to the tag can be calculated using the classic optics equation:

$$a = y(f'-1)/y'$$

where a is the distance from the mobile phone to the tag along the direction of the lens normal axis, y is the object size in real life, e.g., the known size of the barcode or QR code as printed on the tag, y' is the size of the object, e.g., bar or QR code, on the image screen, and f is the focal distance of the smartphone lens.

The precise position of the tag relative to the phone can also be discovered using the same optics equations, now with some variables as vectors:

$$\vec{y} = \vec{y'}\left(\frac{a}{f'-1}\right)$$

where $\vec{y}$ is now the vector normal to the lens axis to the object in real life, $\vec{y'}$ is now the vector from the center of the screen to the object as seen in the screen, and the other variables are the same as before. Employing vector addition to add $\vec{y}$ to the vector $\vec{a}$, where $\vec{a}$ is a vector along the lens axis whose length is equal to a, i.e., the normal distance between the object and lens, results in a new vector that is the position of the object relative to the phone. Adding this new vector to the phone position, as determined in S203, yields the object position in physical space with high accuracy.

The position and orientation of the mobile phone is typically determined by the mobile phone itself on a regular basis. Alternatively, this may be specifically obtained in S205. The orientation of the phone is a vector from which the direction of the lens normal axis is determined, such determination taking into account the camera location on the mobile phone.

The location of the tag with respect to the mobile phone is then combined with the location of the mobile phone as determined in S203 to determine a final location for the tag that has high accuracy. In one embodiment, the combined location is determined by the mobile phone. As such, thereafter, in S207 the determined location is uploaded to the cloud, e.g., to compute system 107.

In another embodiment, the mobile phone may upload to the cloud as distinct items its own location and the location of the tag with respect to the mobile phone. The combined location may then be produced at the compute system in the cloud.

Thereafter, the process is exited, or it may be repeated, e.g., to provide updated location information for the tag as time goes on.

In another embodiment, detection of the tag by the mobile phone of S201 may be performed by the mobile phone optically detecting the tag. For example, the mobile phone could detect the QR code printed on the tag using the mobile phone's camera, and the same image may be used as described above to determine the location of the mobile phone relative to the mobile phone. Furthermore, the QR code is then also used to identify, e.g., uniquely, which tag has been detected.

Regardless of how the tag is identified, an indication of which particular tag the location of which has been determined, which may be the unique identifier received in a BLE message or the detected QR code or some other identifier, is transmitted to compute system 107 in order to be associated with the determined location. In an embodiment, the tag identifier and the determined location are stored together in tag location 109.

In accordance with an aspect of the disclosure, an initial rough location for the tag may be based on a known location of the reader which is receiving BLE signals from the tag, e.g., tag reader 102. This rough location is transmitted to compute system 107. Once a more accurate location based on the location of the mobile phone becomes available, such can be used to supplant the initially obtained rough location based on the known location of the reader.

In some embodiments the location of the tag may be used to trigger an action in response thereto. For example, in one embodiment, if the location of the tag is determined to be outside of a prescribed distance from a specified location an alarm may be raised. In another embodiment, when multiple tags are within a prescribed distance of a specified location the items to which they are attached may be grouped together. In yet another embodiment, instead of manually indicating a package has been delivered by a delivery person, the delivery person can simply take a picture of the tag using a mobile phone so that the location of the tag is determined. The tag location is then compared to the intended delivery location and if there is a match the package is automatically reported as delivered. If there is no match, the failure is brought to the attention of the delivery person to resolve the conflict. Thus, misdeliveries can be avoided.

Figure 3:
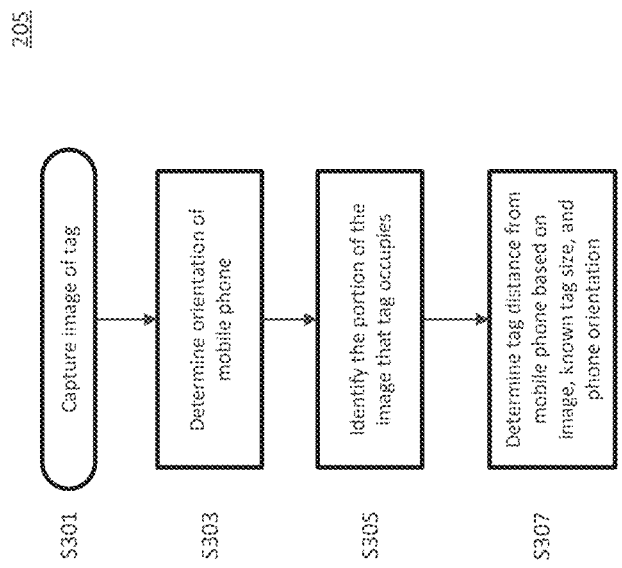
FIG. 3 shows a more detailed view of one of the steps of FIG. 2.

FIG. 3 shows a more detailed view of S205 of FIG. 2.

In S301 an image of the tag is captured by the camera of the mobile phone. Note that this step may have been completed as part of S201 (FIG. 2). Next, in S303, the orientation of the mobile phone is determined based on its internal sensors, e.g., gyroscopic sensors. Thereafter, in S305, the portion of the image that the tag occupies is identified. Finally, in S307, the distance of the tag from the mobile phone is determined based on the known tag size, the portion of the image that the tag occupies, and the determined orientation of the mobile phone.

Figure 4:
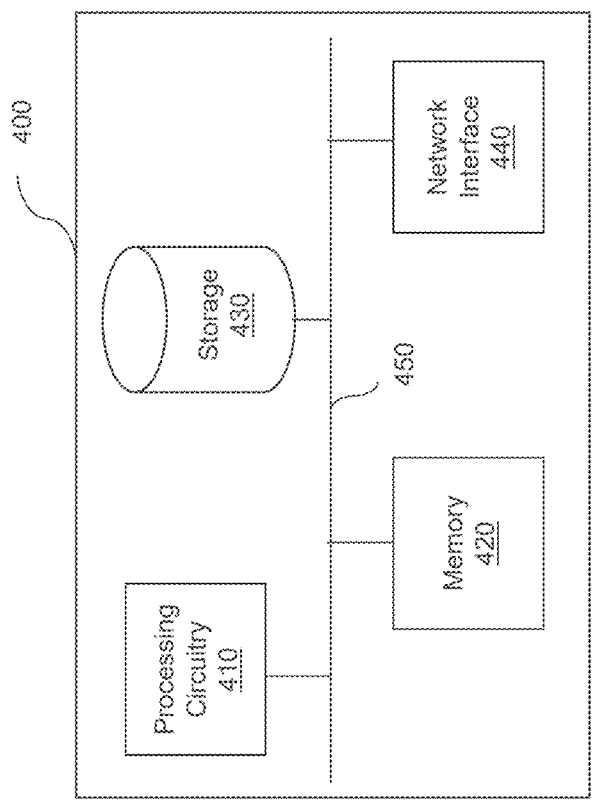
FIG. 4 shows an illustrative system according to an embodiment.

FIG. 4 shows an illustrative system 400 according to an embodiment. System 400 may be used to implement one or more of compute system 107, user device 103, tag reader 102, and even portions of tag 101. System 400 includes a processing circuitry 410 coupled to a memory 420, a storage 430, and a network interface 440. In an embodiment, the components of the system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile, e.g., random access memory, etc., non-volatile, e.g., read only memory, flash memory, etc., or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Video Disks (DVDs), or any other medium which can be used to store the desired information.

The network interface 440 allows the system 400 to communicate with other elements of an overall system, e.g., elements such as are shown in FIG. 1. Network interface 440 may provide for wired communication, wireless communication, or a combination of both and may employ one or more communication protocols.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, firmware executing on hardware, software, software executing on hardware, or any combination thereof. Moreover, the software is implemented tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be implemented as either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for determining a location of a radio frequency wireless tag, comprising:
    obtaining an image of the wireless tag by a camera of a user device;
    obtaining, by the user device, an identifier that uniquely identifies the wireless tag, wherein the identifier is based on radio frequency signals transmitted from the wireless tag;
    determining a location of the user device based on location signals received by the user device;
    determining an orientation of the user device;
    determining a location of the wireless tag with respect to the user device based on the obtained image and the orientation of the user device;
    combining the determined location of the user device with the determined location of the wireless tag with respect to the user device to obtain a final location of the wireless tag; and
    storing the final location of the wireless tag in association with the obtained identifier.

2. The method of claim 1, further comprising:
    triggering an action based on the obtained final location of the wireless tag.

3. The method of claim 1, wherein the combining is performed at the user device and further comprising:
    transmitting the obtained final location of the wireless tag to a remote computing device via a network.

4. The method of claim 1, further comprising transmitting the determined location of the user device with the determined location of the wireless tag with respect to the user device to a remote computing device via a network, and wherein the combining is performed by the remote computing device.

5. The method of claim 1, wherein the radio frequency signals transmitted from the wireless tag contain an encrypted portion of which the identifier is a part, the method further comprising:
    transmitting, by the user device to a remote computing device via a network, the encrypted portion for decryption; and
    receiving, by the user device from the remote computing device via the network, a decrypted version of the identifier.

6. The method of claim 1, wherein the identifier is confirmed based on an image of a code printed on the wireless tag, the image of the code being obtained by a camera of a user device.

7. The method of claim 6, wherein the image of the code printed on the wireless tag is a portion of the image employed to determine the location of the wireless tag with respect to the user device.

8. The method of claim 1, wherein the orientation of the user device is based on gyroscopic signals developed in the user device.

9. A system for determining a location of a wireless tag comprising:
    a processing circuitry; and
    a memory, the memory containing instructions that, when executed by the processing circuitry, configure the system to:
    obtain an image of the wireless tag by a camera of a user device;
    obtain, by the user device, an identifier that uniquely identifies the wireless tag, wherein the identifier is based on radio frequency signals transmitted from the wireless tag;
    determine a location of the user device based on location signals received by the user device;
    determine an orientation of the user device;
    determine a location of the wireless tag with respect to the user device based on the obtained image and the orientation of the user device;
    combine the determined location of the user device with the determined location of the wireless tag with respect to the user device to obtain a final location of the wireless tag; and
    store the final location of the wireless tag in association with the obtained identifier.

10. The system of claim 9, wherein the processing circuitry is further configured to:
    trigger an action based on the obtained final location of the wireless tag.

11. The system of claim 9, wherein the processing circuitry, when the combining is performed at the user device is further configured to:
    transmit the obtained final location of the wireless tag to a remote computing device via a network.

12. The system of claim 9, wherein the processing circuitry is further configured to:
transmit the determined location of the user device with the determined location of the wireless tag with respect to the user device to a remote computing device via a network, and wherein the combining is performed by the remote computing device.

13. The system of claim 9, wherein the radio frequency signals transmitted from the wireless tag contain an encrypted portion of which the identifier is a part and wherein the processing circuitry is further configured to:
transmit, by the user device to a remote computing device via a network, the encrypted portion for decryption; and
receive, by the user device from the remote computing device via the network, a decrypted version of the identifier.

14. The system of claim 9, wherein the identifier is confirmed based on an image of a code printed on the wireless tag, the image of the code being obtained by a camera of a user device.

15. The system of claim 14, wherein the image of the code printed on the wireless tag is a portion of the image employed to determine the location of the wireless tag with respect to the user device.

16. The system of claim 9, wherein the orientation of the user device is based on gyroscopic signals developed in the user device.

17. An method for determining a location of a radio frequency wireless tag, comprising:
receiving a rough location of the location of the wireless tag based on a known location of a reader receiving radio frequency signals transmitted from the wireless tag;
obtaining an image of the wireless tag by a camera of a user device;
determining a location of the user device based on location signals received by the user device;
determining an orientation of the user device;
determining a location of the wireless tag with respect to the user device based on the obtained image and the orientation of the user device;
combining the determined location of the user device with the determined location of the wireless tag with respect to the user device to obtain a final location of the wireless tag; and
substitute the rough location of the wireless tag with the obtained final location of the wireless tag.

18. The method of claim 17, further comprising:
obtaining, by the user device, an identifier that uniquely identifies the wireless tag, wherein the identifier is based on the radio frequency signals transmitted from the wireless tag; and
storing the obtained final location of the wireless tag in association with the obtained identifier.

19. The method of claim 18, wherein the radio frequency signals transmitted from the wireless tag contain an encrypted portion of which an identifier of the wireless tag is a part, the method further comprising:
transmitting, by the user device to a remote computing device via a network, the encrypted portion for decryption; and
receiving, by the user device from the remote computing device via the network, a decrypted version of the identifier.

* * * * *